United States Patent
Bledsoe

[15] 3,651,969
[45] Mar. 28, 1972

[54] COMBINATION HOUSE AND AUXILIARY TRAILER APPARATUS

[72] Inventor: Sherman H. Bledsoe, P.O. Box 1144, Cottonwood, Ariz. 86326

[22] Filed: Sept. 16, 1970

[21] Appl. No.: 72,583

[52] U.S. Cl. .........................214/515, 280/414 R, 296/23 B
[51] Int. Cl. ..............................................................B60p 3/36
[58] Field of Search ..................214/38.20, 83.24, 500, 515; 280/414 R; 296/23 MC, 23 B

[56] References Cited

UNITED STATES PATENTS

| | | | |
|---|---|---|---|
| 3,556,582 | 1/1971 | Bledsoe | 280/414 R |
| 3,380,607 | 4/1968 | Dale | 280/414 R |

*Primary Examiner*—Gerald M. Forlenza
*Assistant Examiner*—Lawrence J. Oresky
*Attorney*—Fulwider, Patton, Rieber, Lee & Utecht

[57] ABSTRACT

Combination house and auxiliary trailer apparatus including a frame carried on a pair of wheels and having a main closure mounted thereon. A pair of spaced apart tracks project rearwardly from the main closure and an extendible closure is carried thereon for telescopical receipt in such main closure. An auxiliary trailer is provided with a rear portion that is receivable between such tracks and includes a pair of support wheels and retraction means for retracting such support wheels to an elevated position. Coupling means is provided for coupling the auxiliary trailer to the rear portion of the house trailer whereby the extendible closure may be moved to its retracted position in the main closure and the auxiliary trailer moved into position with its rear portion extending between the tracks. The auxiliary trailer may then be coupled to the house trailer and its support wheels elevated to enable the combination to be towed as a unit from the tongue of the house trailer. When the destination is reached, the retractable wheels may be lowered and the auxiliary trailer uncoupled from the house trailer to thereby free such auxiliary trailer for use independent of the house trailer and enable the extendible closure to be moved rearwardly on the tracks to cooperate with the main closure in providing a composite closed area.

13 Claims, 15 Drawing Figures

PATENTED MAR 28 1972 3,651,969
SHEET 1 OF 3
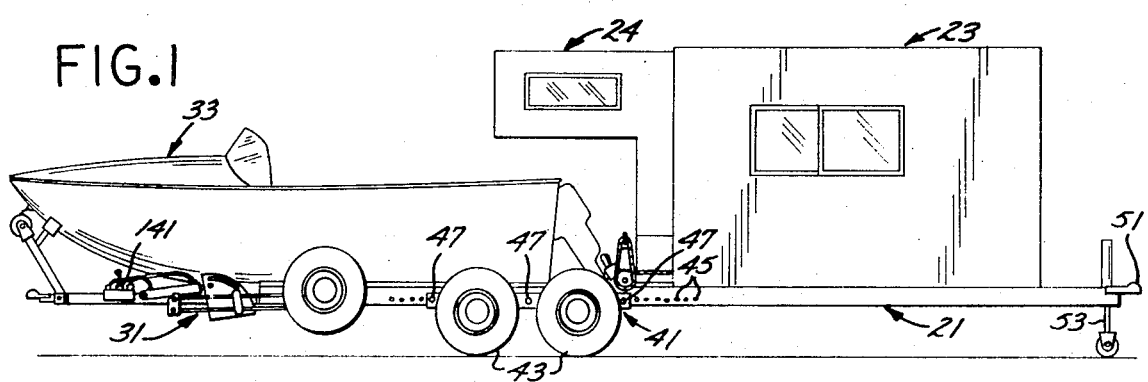
FIG.1
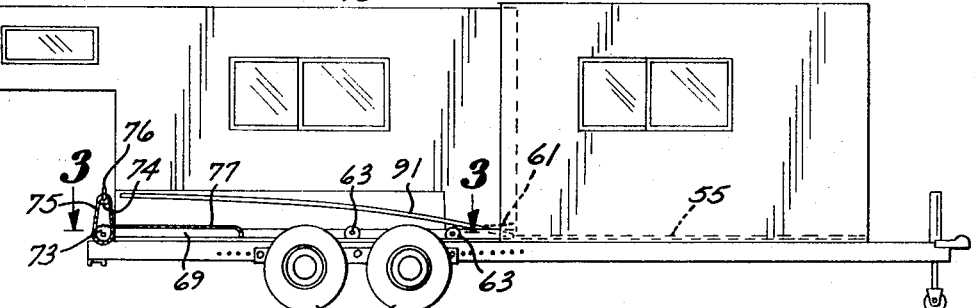
FIG.2
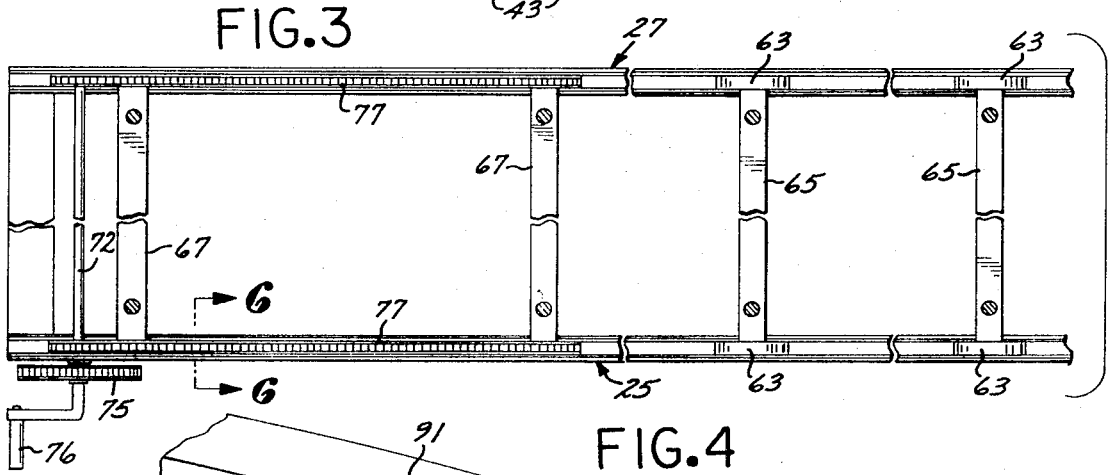
FIG.3
FIG.4
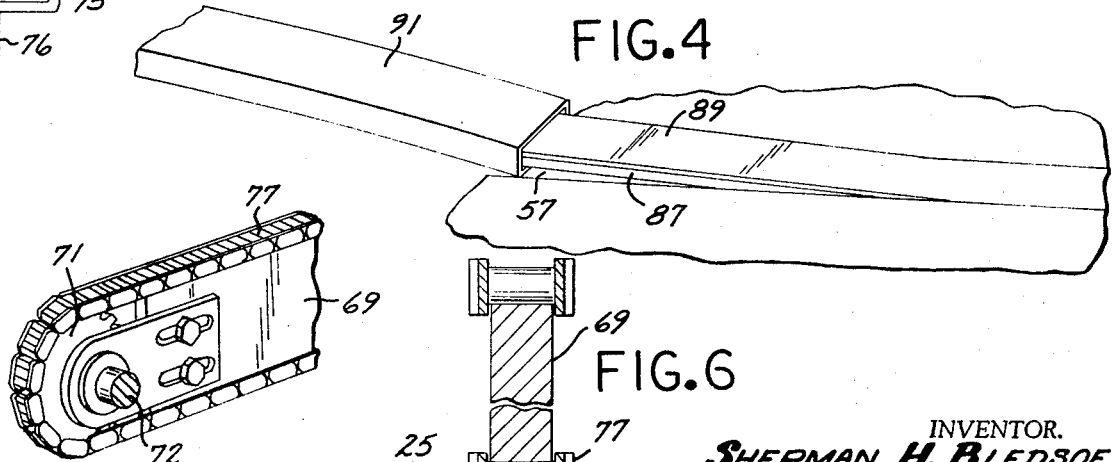
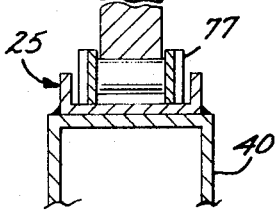
FIG.5
FIG.6
INVENTOR.
SHERMAN H. BLEDSOE
BY Fulwider, Patton, Rieber,
Lee and Utecht
ATTORNEYS

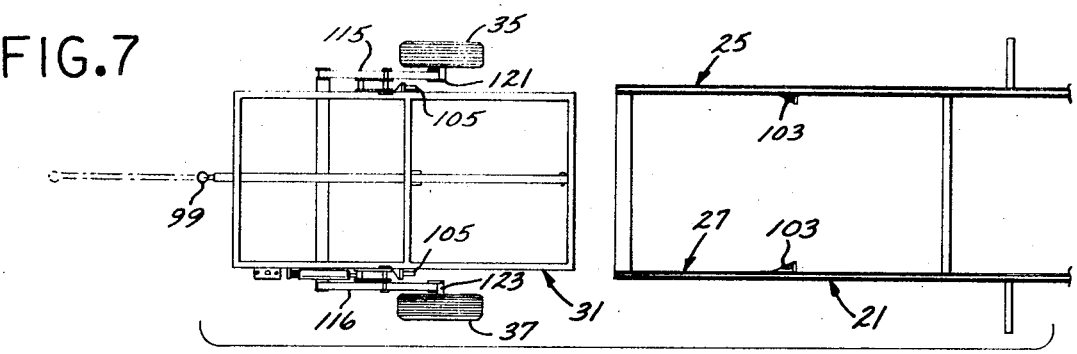
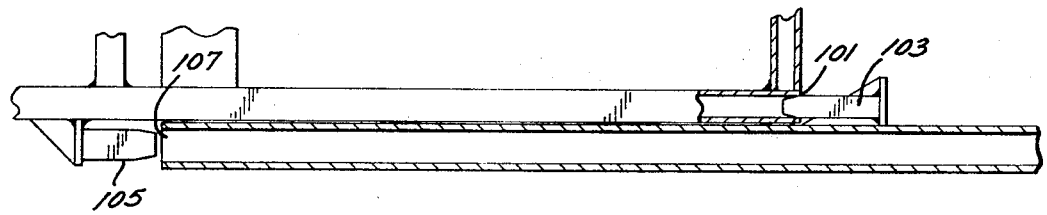
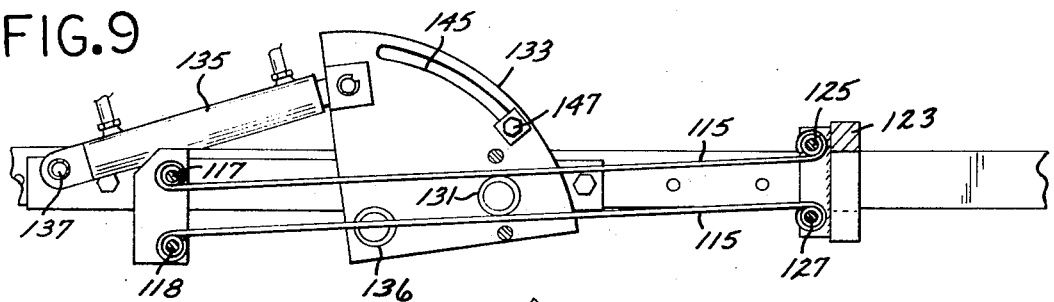
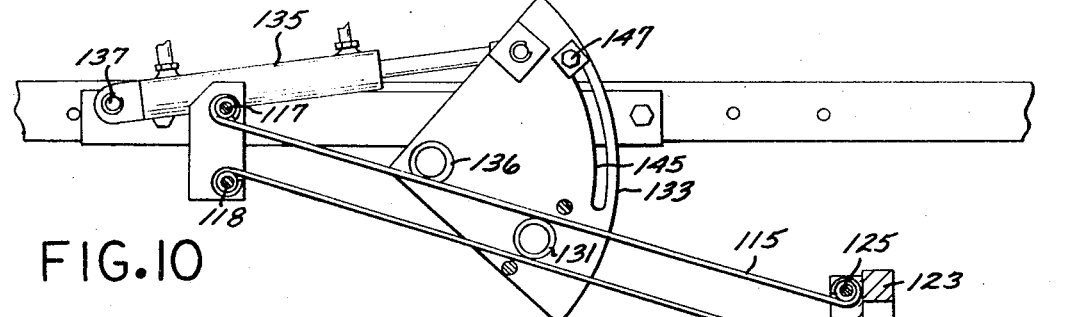
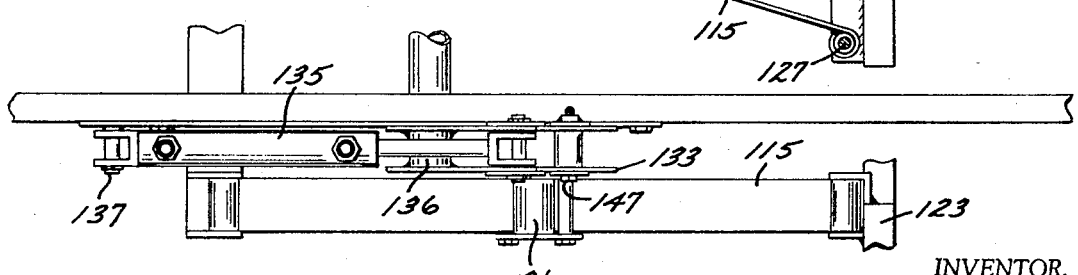

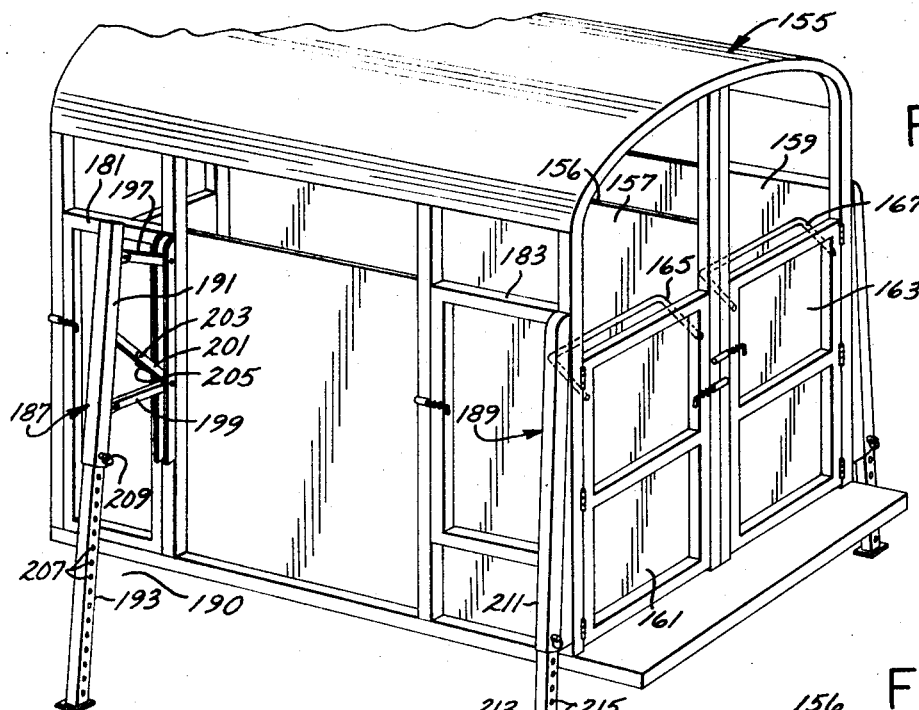
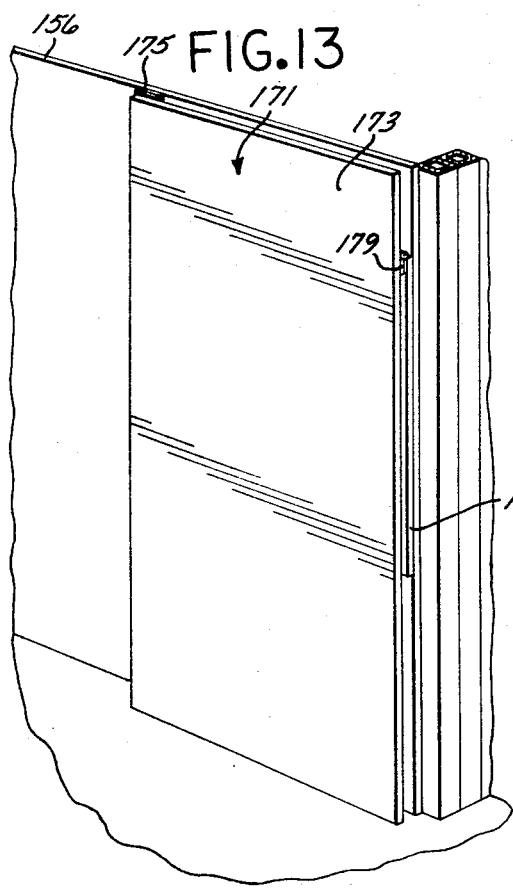
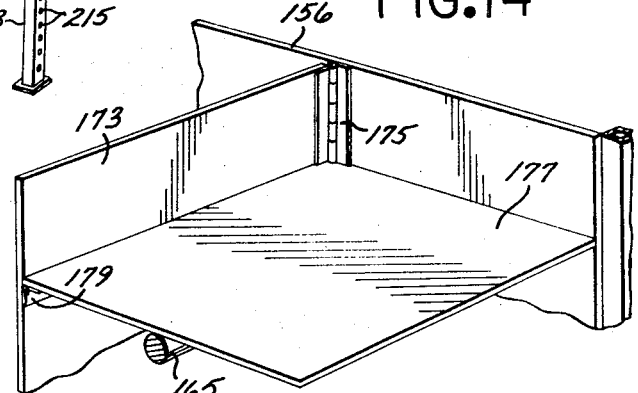
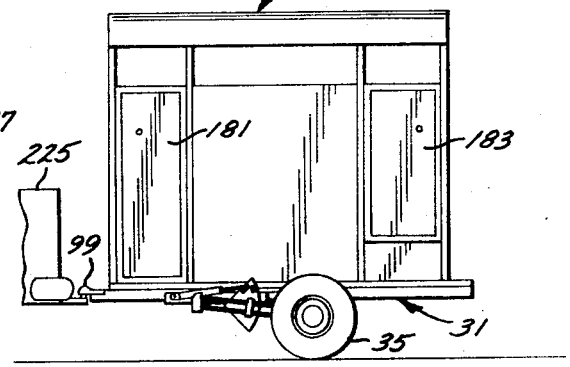

COMBINATION HOUSE AND AUXILIARY TRAILER APPARATUS

BACKGROUND OF THE INVENTION

1. Field of the Invention:

The present invention relates to a house trailer which may be partially collapsed to have an auxiliary trailer coupled therewith so the combination can be towed as a unit.

2. Description of the Prior Art:

Numerous house trailer arrangements have been proposed that include closures which may be opened to receive boats thereinto. Further, boat trailers and camping trailers have been proposed which may be coupled together for towing as a unit. An example of an arrangement of this type is shown in U.S. Pat. No. 3,348,859. However, devices of this type suffer the shortcoming that one trailer is not carried from the other thereby extremely limiting the usefulness of the combined apparatus and rendering the combined device unacceptable for towing behind a passenger vehicle under numerous state laws.

SUMMARY OF THE INVENTION

The house and auxiliary trailer combination of present invention is characterized by a house trailer which includes a pair of coextensive forwardly and rearwardly projecting tracks having an extendible closure portion carried thereon. The extendible closure portion may be retracted into a main closure portion and the rear extremity of a boat trailer received between the rearwardly projecting track portions. The auxiliary trailer may be coupled to the house trailer and the wheels thereof retracted to thereby support the auxiliary trailer from the house trailer and enable the combination thereof to be towed as a unit.

An object of the present invention is to provide a combination house and auxiliary trailer apparatus wherein the house trailer may be partially collapsed for convenient coupling thereto of the auxiliary trailer to thereby reduce the length of the overall unit.

Another object of the present invention is to provide a combination house and auxiliary trailer apparatus of the type described that includes convenient drive means for moving the extendible closure portion between its retracted and extended positions.

Another object of the present invention is to provide a combination house and auxiliary trailer apparatus of the type described which may conveniently be utilized for conveyance of livestock, such as horses.

These and other objects and the advantages of the present invention will become apparent from a consideration of the following detailed description when taken in conjunction with the accompanying drawings.

DESCRIPTION OF THE DRAWINGS

FIG. 1 is a side elevational view of a combination house and auxiliary trailer apparatus embodying the present invention;

FIG. 2 is a side elevational view similar to FIG. 1 but showing the house trailer with the auxiliary trailer disconnected therefrom;

FIG. 3 is a horizontal sectional view, in enlarged scale, taken along the line 3—3 of FIG. 2;

FIG. 4 is a perspective detail view, in enlarged scale, of a portion of the combination house and auxiliary trailer apparatus shown in FIG. 2;

FIG. 5 is a partial perspective view, in enlarged scale and partially broken away, of the left hand end of the combination house and auxiliary trailer apparatus shown in FIG. 3;

FIG. 6 is a broken vertical sectional view, in enlarged scale, taken along the line 6—6 of FIG. 3;

FIG. 7 is a top plan view of the frames included in the combination house and auxiliary trailer apparatus shown in FIG. 1;

FIG. 8 is an enlarged plan view, partially broken away, similar to FIG. 7;

FIGS. 9 and 10 are partial side elevational views, in enlarged scale, of a wheel retraction mechanism included in the auxiliary trailer shown in FIG. 7 and showing such mechanism in two different positions;

FIG. 11 is a top plan view of the wheel retraction mechanism shown in FIG. 9;

FIG. 12 is a perspective view of a horse stall which may be utilized with the combination house and auxiliary trailer apparatus shown in FIG. 1;

FIG. 13 is a partial perspective view, in enlarged scale, of a feed bin included in the horse stall shown in FIG. 12;

FIG. 14 is a partial perspective view of a portion of a feed tray included in the feed bin shown in FIG. 13; and FIG. 15 is a side elevational view, in reduced scale, showing the horse stall shown in FIG. 12 mounted on the auxiliary trailer included in the combination house and auxiliary trailer apparatus shown in FIG. 1.

DESCRIPTION OF THE PREFERRED EMBODIMENT

The combination house and auxiliary trailer apparatus of present invention includes, generally, a house trailer 21 mounting a main closure 23 and including a pair of rails 25 and 27 (FIG. 7) projecting rearwardly thereof for carrying an extendible closure. Still speaking generally, an auxiliary trailer 31 is provided for carrying a boat 33 or the like and includes a pair of retractable wheels 35 and 37 (FIG. 7). The rear extremity of the auxiliary trailer 31 is receivable between the tracks 25 and 27 whereby such auxiliary trailer may be backed into position between such tracks and coupled thereto to be supported in cantilever fashion as shown in FIG. 1 while the retractable wheels 35 and 37 are raised to the elevated position shown in FIG. 1 so the entire combination may be towed from the tongue of the house trailer 21.

Referring to FIGS. 6 and 7, the house trailer 21 includes a framework formed by a pair of longitudinally projecting beams 40 having upwardly facing channels mounted thereon to form the tracks 25 and 27. Referring to FIGS. 1 and 2, an undercarriage, generally designated 41, is carried on two pairs of support wheels 43 and itself carries the frame of the trailer 21. A plurality of longitudinally spaced bores 45 are provided in the framework of the trailer 21 for receipt of positioning bolts 47 which hold the undercarriage 41 in the desired position under the trailer 21 depending on whether such trailer is being utilized with the auxiliary trailer mounted thereon or is being utilized separately therefrom.

The front end of the trailer 21 terminates in a conventional tongue 51 for connection with a towing vehicle and may be supported by a jack post 53.

The main closure 23 is of generally rigid construction and includes a main floor 55 which has a pair of forwardly and rearwardly projecting slots 57 disposed in alignment over the respective tracks 25 and 27. The extendible closure 24 is also of generally rigid construction and includes a floor 61 which is carried on a series of rollers 63 mounted at the outer extremities of axles 65 which are interposed under the rear portion of the extendible floor 61. The rollers 63 ride in the respective tracks 25 and 27 and travel forwardly and rearwardly therein to carry the extendible closure 24 from the retracted position shown in FIG. 1 to the extended position shown in FIG. 2.

Referring to FIGS. 3 and 5, the rear extremity of the extendible closure 24 is carried on a pair of transversely projecting support members 67 that have longitudinally extending slides 69 extending between the ends thereof and which are secured thereto. The slides 69 are aligned with the respective tracks 25 and 27 and chain sprockets 71 are disposed at the opposite ends thereof, the front sprockets 71 being affixed to the opposite ends of a drive shaft 72 which has a driven sprocket 73 mounted at one end thereof. The driven sprocket 73 is connected with a drive sprocket 74 by means of a drive chain 75. A handle 76 is affixed to the drive sprocket 74. Bicycle type chains 77 extend over the respective pairs of sprockets on opposite sides of the closure 24 and ride on opposite sides of the slides 69 as shown in FIGS. 5 and 6, the lower runs thereof frictionally engaging the respective tracks 25 and 27.

Referring to FIGS. 2 and 4, a pair of slightly resilient slats 87 are provided for insertion in the respective slots 57 overlying the tracks 25 and 27 to cooperate with the floor 55 of the main closure 23 to entirely close such floor when the extendible closure 14 is in its extended position. Such slats 87 are covered with carpeting 89 which matches the carpeting on the floor 55 of the main closure 23. The slats 87 are secured on their front extremities to the front end of the floor 55 and have their rear extremities received in upwardly and rearwardly inclined housings 91 mounted on either side of the extendible closure 24. Consequently, as the extendible closure is retracted into the main closure 23, the slats 87 will be fed into the housings 91 to lift them out of the slots 57 so the rollers 63 may roll forwardly on the tracks 25 and 27 and when such extendible closure 24 is moved rearwardly to its extended position shown in FIG. 2, the slats 87 will be fed out of the housing 91 and automatically reinserted in the respective slots 57.

Referring to FIG. 7, the auxiliary trailer 31 is generally rectangular in shape and includes a telescopical tongue 99 on its front extremity whereby such tongue may be telescoped outwardly for towing the trailer 31 itself or may be telescoped inwardly when the auxiliary trailer 31 is mounted on the house trailer 21.

Referring to FIGS. 7 and 8, the rear extremity of the auxiliary trailer 31 has a pair of rearwardly opening bores 101 formed in its opposite sides for receipt of forwardly projecting pins 103 mounted on the opposite sides of the frame of the house trailer 21 when the trailers 21 and 31 are telescoped together in position for being coupled to one another. Also, a pair of rearwardly projecting pins 105 are mounted intermediately on opposite sides of the auxiliary trailer 31 for telescopical receipt in forwardly opening bores 107 formed in the rear extremity of the house trailer 21.

Referring to FIGS. 9, 10 and 11, the retractable wheels 35 and 37 are each mounted from the trailer 31 by means of a pair of elongated leaf spring lever arms 115 which are pivotally mounted on their forward extremities to such trailer 31 by means of pivot pins 117 and 118 and carry the axle mounts 121 and 123 of the respective retractable wheels 35 and 37 from their rear extremities by means of pivot pins 125 and 127. Consequently, the springs 115 form a generally parallelogrammatic arrangement and a transversely projecting drive pin 131 has its outer extremity received intermediately between the respective pairs of springs 115 to thereby raise and lower the rear extremity of such springs as such pin is moved upwardly and downwardly. The drive pin 131 is carried on its inner extremity from a pie-shaped pivot plate 133 which is pivotally mounted from the trailer 31 by means of a pivot pin 136.

Still referring to FIGS. 9 and 10, the upper extremity of the pivot plate 133 is connected with the ram end of a hydraulic cylinder 135, such cylinder being carried on its dead end from the trailer 31 by means of a pivot pin 137. Referring to FIG. 1, hydraulic fluid is provided to the cylinders 135 by means of a manual hydraulic pump 141. Referring again to FIGS. 9 and 10, an arcuate slot 145 is formed in the radially outer extremities of the respective pivot plates 133 for receipt of respective follower bolts 147 that are carried from the trailer 31 to thereby limit travel of the pivot plate 133 and enable such bolt to be tightened down to lock the plates in a desired position.

Referring to FIGS. 12–15, a dual horse stall, generally designated 155, is provided for mounting on the auxiliary trailer 31. The horse stall 155 includes a longitudinal partition 156 that forms a pair of stalls 157 and 159 on opposite sides thereof. The horse stalls 157 and 159 have respective doors 161 at their front and rear ends whereby such stalls 157 and 159 may be opened from either end. Mounted on the respective doors 161 and 163 are generally U-shaped butt bars 165 and 167.

Referring to FIGS. 13 and 14, collapsible feed bins, generally designated 171, are mounted at the opposite ends of the respective stalls 157 and 159 and include respective transverse doors 173 carried from the central partition 156 by means of vertical hinges 175. Each of these doors 173 has a feed tray 177 mounted therefrom by means of a horizontal hinge 179. Consequently, the feed bin 171 at the head of the horse may have the door 173 swung to its transverse position shown in FIG. 14 and the tray 177 pivoted to the position shown in FIG. 14 resting on the butt bar 165 so feed may be placed thereon.

Referring to FIG. 12, a pair of side opening doors 181 and 183 are provided at the front and rear ends, respectively, of the respective horse stalls 157 and 159 whereby the door at the head of the horse may be opened to obtain feed from beneath the feed tray 177 for deposits thereon to feed a horse tied in such stall.

A pair of strut devices, generally designated 187 and 189, are mounted forwardly and rearwardly on opposite sides of the horse stall 155 for supporting such stall in its elevated position while the trailer 31 is lowered and driven away to free such trailer for use independently of the stall. The struts 187 are spaced from the side of the stall 155 when they are in their lowered position to thereby provide space 190 for passage of the respective wheels 35 and 37. Each strut 187 includes a vertically extending square-in-cross-section female tube 191 which receives a male tube or foot 193 in its bottom extremity. The foot 193 is supported from the horse stall 155 by means of a pair of pivotal links 197 and 199, the link 199 being slightly longer than the link 197 to cause the lower extremity of such tube to be pivoted out away from the stall 155 a distance greater than the upper extremity of such tube. A third link 201 is pivoted centrally at 203 and has a limiting tab 205 to limit over-pivoting thereof to thereby provide an over-the-center type action which locks the tube 187 in its supporting position. The foot 193 is also square-in-cross-section and includes a plurality of vertically spaced bores 207 for receipt of a lock pin 209 received in a transverse bore through the lower extremity of the tube 187. The rear strut 189 includes a downwardly opening female tube 211 which has a male foot 213 telescoped upwardly thereinto and such foot is also formed with a plurality of longitudinally spaced bores 215 for selective receipt of a lock pin 217 received in a bore in the lower extremity of such female tube 211.

In operation, the house trailer 21 may have its tongue supported on the jack post 53 as shown in FIG. 1 and the drive handle 76 on the extendible closure 24 may be rotated to rotate the chains 77 clockwise as viewed in FIGS. 1 and 2 to thereby cause the frictional engagement with the respective tracks 25 and 27 to drive the extendible closure 24 forwardly on the trailer 21 to telescope it inside the main closure 23. During such retraction of the extendible closure 24, the slats 87 filling the slots 57 in the floor 55 of the main closure 23 will be fed upwardly into the respective housings 91 carried on the opposite sides of the extendible closure 24 to open such slots 57 so the rollers 63 carrying the rear extremity of such extendible closure 24 can roll freely forwardly on such tracks. The auxiliary trailer 31 with the boat 33 mounted thereon may then be backed into position between the tracks 25 and 27 until the coupling pins 103 (FIG. 8) are received in the bores 101 in the rear of the trailer 33 and the coupling pins 105 are received in the bores 107 in the rear extremity of the house trailer 21. The frames of the trailers 21 and 31 may then be secured together as by means of bolts or clamps (not shown).

The retraction jack 141 may then be actuated to retract the hydraulic cylinder 135 (FIG. 10) to pivot the pivot plate 133 upwardly to the position shown in FIG. 9 to thereby raise the rear extremity of the springs 115 upwardly to the position shown in FIG. 9 thereby elevating the raisable wheels 35 and 37 to the position shown in FIG. 1. The towing vehicle may then be disconnected from the boat trailer tongue 99 and such tongue telescoped to the solid line position shown in FIG. 7. The towing vehicle may then be moved around to the front of the house trailer 21 and connected therewith. The jack post 53 may then be retracted and the house and auxiliary trailer combination towed as a unit with the auxiliary trailer 31 supported from the house trailer 21.

When the destination is reached, the house trailer 21 may be parked and the jack post 53 lowered and the towing vehicle uncoupled therefrom. The retraction jack 141 may then be actuated to extend the hydraulic cylinders 135 (FIG. 9) to pivot the pivot plates 133 clockwise and lower the rear extremities of the leaf springs 115 to the position shown in FIG. 10 to thereby lower the retractable wheels 35 and 37 to their supporting position to transfer the weight of the auxiliary trailer 31 thereto. The towing vehicle may then be connected with the tongue of the auxiliary trailer 31 and the trailers 21 and 31 uncoupled from each other and the auxiliary trailer towed away for use independent of the house trailer 21. The drive handle 76 may then be rotated to rotate the drive chains 77 counterclockwise as viewed in FIG. 1 to cause frictional engagement thereof with the respective tracks 25 and 27 to draw the extendible closure 24 rearwardly to telescope it rearwardly out of the main closure 23 to the position shown in FIG. 2. As such extendible closure 24 is moved rearwardly, the slats 87 will be fed out of the housings 91 as shown in FIG. 4 and laid in the slots 57 to automatically cover such slots and form a continuous floor throughout the bottom of the main closure 23.

Referring to FIGS. 12 and 15, the horse stall 155 may be mounted on the auxiliary trailer 31 and may be towed by a towing vehicle 225 as shown in FIG. 15 with the stall 155 being towed by the vehicle 225 from the front end of the trailer 31. The horses or livestock therein will face forwardly with respect to such trailer 31 and the feed bin 171 at the front of the trailer 31 will have its door 173 pivoted outwardly and the tray 177 raised to be carried on the butt bar 165. The feed bin 171 at the rear of the trailer 31 will be collapsed to the position shown in FIG. 13.

When the house trailer 21 and auxiliary trailer 31 having the horse trailer 155 mounted thereon are to be towed as a unit, they will be coupled together as described hereinabove. Also, when the destination is reached, the trailers may be uncoupled and, if desired, the struts 187 and 189 may be lowered to the supporting position shown in FIG. 12 and the pins 209 and 217 inserted to hold the respective feet 193 and 215 telescoped outwardly in their supporting positions. The hydraulic pump 141 may then be actuated to retract the retractable wheels 35 and 37 slightly to lower the trailer 31 somewhat to be moved outwardly from beneath the horse stall 155. The trailer 31 will then be free for use in carrying a boat or any other load to be conveyed.

From the foregoing it will be apparent that the combination house and auxiliary trailer apparatus of present invention provides an economical and convenient means for transporting both a house trailer and a boat or horse trailer to a particular destination by a single conventional towing vehicle. When the destination is reached the trailers may be separated and the house trailer parked in a relatively permanent location while the boat trailer is free for traveling to and from a launching site or the like. Additionally, the extendible closure in the house trailer may be extended to provide additional living space while the house trailer is in its parked position.

Various modifications and changes may be made with regard to the foregoing detailed description without departing from the spirit of the invention.

I CLAIM:

1. Combination house and auxiliary trailer apparatus comprising:
    a house trailer including a frame carried on a pair of wheels and having a main closure supported thereon;
    track means carried from said frame and projecting rearwardly of said closure;
    an extendible closure connectable on one end with said main closure portion and including an extendible floor carried on said track means;
    an auxiliary trailer having a rear portion receivable in said track means;
    a pair of retractable wheels for supporting said auxiliary track;
    retraction means for mounting said retractable wheels on said auxiliary trailer for retracting said retractable wheels to an elevated position; and
    coupling means for coupling the rear end of said auxiliary trailer to said house trailer and whereby said extendible closure may be retracted, said rear portion of said auxiliary trailer extended into said track means and said coupling means coupled to couple said auxiliary trailer to said house trailer, said retraction means actuated to retract said retractable wheels so said combination auxiliary and house trailer may be towed as a unit and when the destination is reached said retraction means may be actuated to lower said retractable wheels and said coupling means uncoupled and said trailers separated to enable said extendible floor to be positioned on said track means so said extendible closure may be positioned thereover to cooperate with said main closure to form a composite closure supported on said house trailer.

2. Combination house and auxiliary trailer apparatus as set forth in claim 1 that includes:
    drive means connected with said floor for driving said floor forwardly and rearwardly on said track means.

3. Combination house and auxiliary trailer apparatus as set forth in claim 1 wherein:
    said main closure includes a main floor having a pair of longitudinally extending slots therein;
    said track means includes a pair of tracks projecting forwardly in alignment with said slots;
    said extendible floor includes roller means for engaging said pair of tracks to carry said extendible floor forwardly over said main floor; and
    a pair of slats for receipt in said slots whereby said extendible floor may be moved rearwardly to its extended position and said slats may be placed in said slots to conceal said tracks from view.

4. Combination house and auxiliary trailer apparatus as set forth in claim 1 wherein:
    said retraction means is in the form of a pair of lever arms pivotally connected at their respective one ends to said auxiliary trailer and carrying said retractable wheels from their respective opposite ends and lifting means for pivoting said lever arms to raise said retractable wheels to their elevated position.

5. Combination house and auxiliary trailer apparatus as set forth in claim 1 wherein:
    said auxiliary trailer includes boat support means for receipt of a boat.

6. Combination house and auxiliary trailer apparatus as set forth in claim 1 wherein:
    said auxiliary trailer includes a horse stall for receipt of a horse.

7. Combination house and auxiliary trailer apparatus as set forth in claim 2 wherein:
    said drive means includes friction means rotatably mounted on said extendible floor and engaged with said track means, and means for rotating said friction means.

8. Combination house and auxiliary trailer apparatus as set forth in claim 3 wherein:
    said slats are affixed on their front ends to said house trailer; and
    said auxiliary trailer includes a pair of housings for receipt of the rear extremities of said slats whereby said slats will be automatically raised out of said slots and fed into said housings as said extendible floor is moved forwardly on said house trailer and will be automatically fed out of said housings and into said slots as said extendible floor is moved rearwardly on said house trailer.

9. Combination house and auxiliary trailer apparatus as set forth in claim 4 wherein:
    said lifting means is in the form of fluid cylinder means.

10. Combination house and auxiliary trailer apparatus as set forth in claim 6 wherein:

said auxiliary trailer includes a plurality of support struts carried from the opposite sides thereof and operable to engage the ground and support said horse stall while said retraction means is actuated to lower said auxiliary trailer to disengage said horse stall.

11. Combination house and auxiliary trailer apparatus as set forth in claim 7 wherein:

said friction means includes a pair of spaced apart sprockets carried on said extendible floor and a chain carried on said sprockets for frictional engagement with said track means.

12. Combination house and auxiliary trailer apparatus as set forth in claim 6 wherein:

said horse stall includes doors at the opposite ends thereof whereby a horse may be brought in from either end thereof.

13. Combination house and auxiliary trailer apparatus as set forth in claim 12 wherein:

said horse stall includes butt bars carried from said respective doors and collapsible feed bins disposed at the opposite ends of said stall and movable into supporting position on said respective butt bars.

* * * * *